March 17, 1936.  E. F. SMITH  2,034,213
PORTABLE ICE CREAM FREEZER
Filed Oct. 25, 1934
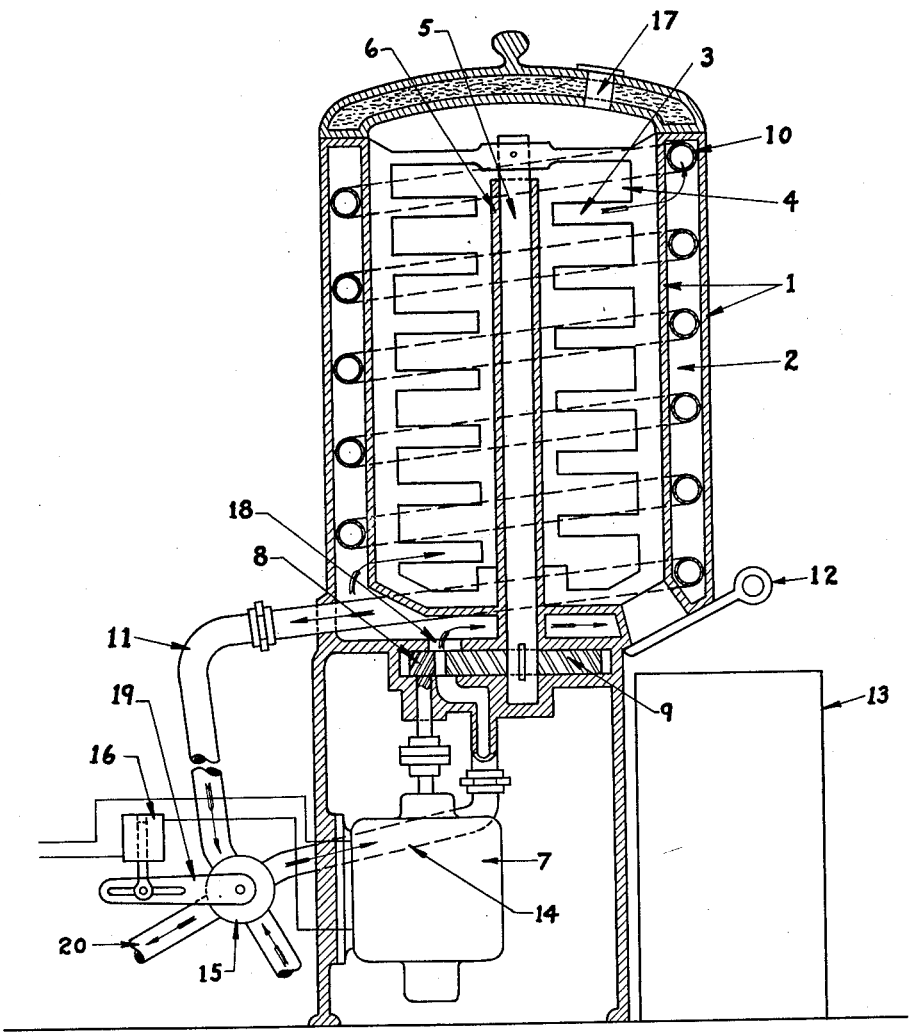
INVENTOR.
Ernest F. Smith
BY
Zabel Carlson & Wells
ATTORNEYS.

Patented Mar. 17, 1936

2,034,213

UNITED STATES PATENT OFFICE 2,034,213

PORTABLE ICE CREAM FREEZER

Ernest F. Smith, Greenwood, Nebr., assignor of one-third to H. W. McFadden and one-third to H. L. Reynolds, Maywood, Ill.

Application October 25, 1934, Serial No. 749,957

6 Claims. (Cl. 62—114)

My invention relates to freezers of the portable type particularly for use for freezing ice cream and similar products wherever access may be had to a cooling medium such as cold brine.

It is the principal object of this invention to provide a novel and efficient structure for circulating the brine or cooling medium whereby freezing of the mix in the freezer can be accomplished with a relatively high temperature of brine.

It is a further object of my invention to provide a device of the character hereinbefore mentioned with a novel means for pumping the brine through the freezer.

It is also an object of this invention to provide means for controlling the degree of freezing of the contents of the freezer by automatically controlling the flow of brine thereto in response to the freezing of the mix in the freezer.

Other and more specific objects and advantages of the invention will appear as the description proceeds in connection with the accompanying drawing wherein the preferred form of the invention is shown. It is to be understood, however, that the drawing and description are illustrative only and are not to be taken as limiting the invention except in so far as it is limited by the claims.

In the drawing, the figure is a vertical sectional view taken through the freezer.

Referring now in detail to the drawing, the device consists of a jacketed container 1 providing an inner chamber for receiving the ice cream mix, and an outer chamber at 2 for circulating the cooling brine. The chamber for receiving the mix to be frozen is provided with a rotating scraper 4 having the paddles 3 thereon. The scraper is mounted at its top upon the shaft 5 which extends down through the sleeve 6 to the exterior of the casing or container.

The lower end of the shaft 5 has a gear 9 fixed thereon which meshes with the pinion 8 driven by the motor 7.

The means for directing the circulation within the chamber 2 consists in a copper tube 10 coiled about the inner chamber and lying within the chamber 2 so as to substantially provide a spiral partition within the chamber 2. The brine enters the chamber 2 at the bottom as shown by the inlet at 18 and travels upwardly in a spiral direction in direct contact with the wall of the inner chamber to enter the pipe 10 at the top of the container. The pipe 10 then carries the liquid spirally downward to the bottom of the container and out through the outlet 11 and through the four-way valve 15 back to the source. It is understood, of course, that the cooling fluid such as brine enters through the valve 15 and pipe 14.

By the method of circulation just described, the coldest brine enters the chamber 2 and contacts directly with the wall of the freezing chamber as it rises through the chamber 2. Then, by passing down through the tube 10 through the brine within the walls of chamber 2, the outgoing brine tends somewhat to equalize the temperature of the top and bottom of the freezing chamber. Also, because of the long travel of the brine in direct contact with the wall of the freezing chamber on its spiral path, the speed at which the brine must travel while contacting the freezing chamber is quite high, and therefore the mixture within the chamber can be frozen with a relatively high temperature of brine.

The driving gears 8 and 9 also function as a pump to pump the liquid up through the inlet 18. This result is accomplished by the spiral arrangement of the gear teeth on the gears as indicated clearly in the drawing.

During the operation of the freezer, the cream mix freezes on the inner wall and is scraped off by the scraper, and this operation continues until the cream is all frozen to a consistency sufficient for hardening purposes at which time the motor 7 naturally becomes heavily loaded due to the force necessary to turn the mixer and scraper 4.

I utilize this excessive load of the motor as a means for automatically stopping the freezing action. The current for the motor passes through the solenoid coil 16 which is so arranged that, when the current exceeds a certain amount, the coil will operate to move the lever 19 on the four-way valve 15 in a direction to cut off the supply of brine to the pipe 14 and direct it outwardly through the outlet pipe 20 from the valve 15. Then, while the motor is still running, the emptying gate 12 is opened so as to discharge the contents of the mixer into a suitable container such as 13 which may be set away to harden in a cold chamber. The attendant may then close the gate 12, again fill the mixer through the inlet 17, and repeat the process of freezing.

From the above description, it is believed that the construction and operation of this device will be readily apparent to those skilled in this art.

Having thus described my invention, what I claim as new and desire to secure by Letters Patent is:

1. A portable freezer having in combination, an inner chamber for the material to be frozen, a cooling fluid chamber around the first named chamber, means to circulate the cooling fluid therein spirally upwardly in contact with the wall of the inner chamber, and downwardly out of contact with said wall.

2. A portable freezer comprising in combination a fluid container, a stirring device therein, said container having an inner wall and an outer wall spaced apart and having an inlet to the space between said walls, and means in said space for causing a cooling fluid introduced at said inlet to traverse said space in direct contact with the inner wall, said means providing a passage for conducting the fluid back through the incoming fluid to an outlet adjacent said inlet.

3. A portable freezer comprising a container having an inner wall, and an outer wall spaced apart to form a fluid receiving chamber around the container, and a pipe in said chamber running spirally around the container from bottom to top, said pipe being open to the chamber at the top and having an outlet through the chamber wall at the bottom, said chamber having an inlet opening at the bottom thereof.

4. A portable freezer comprising a container having an inner wall and an outer wall spaced apart to form a fluid receiving chamber around the container, and a pipe in said chamber running spirally around the container from bottom to top, said pipe being open to the chamber at the top and having an outlet through the chamber wall at the bottom, said chamber having an inlet opening at the bottom thereof, and means for forcing fluid into said chamber through said inlet.

5. A portable freezer having in combination, an inner chamber for the material to be frozen, a cooling fluid chamber around the first named chamber, means to circulate the cooling fluid therein spirally upwardly in contact with the wall of the inner chamber, and passage means for said fluid comprising an outlet pipe in the cooling fluid chamber extending spirally around the inner chamber, and opening at its upper end into the cooling fluid chamber.

6. A portable freezer comprising in combination, a fluid container, a stirring device therein, said container having an inner wall and an outer wall spaced apart and having an inlet to the space between said walls, and means in said space for causing a cooling fluid introduced at said inlet to traverse said space in direct contact with the inner wall, a drive shaft for said stirring device, and a pump comprising gears driving said shaft for pumping fluid through said inlet.

ERNEST F. SMITH.